United States Patent [19]

Hori et al.

[11] Patent Number: 5,162,380
[45] Date of Patent: Nov. 10, 1992

[54] METHOD OF PREPARATION OF FOAMED ARTICLES OF POLYVINYL CHLORIDE RESINS

[75] Inventors: Toshihiko Hori; Kazunori Ueki, both of Yokohama, Japan

[73] Assignee: Nippon Zeon Company Limited, Tokyo, Japan

[21] Appl. No.: 872,700

[22] Filed: Apr. 24, 1992

[30] Foreign Application Priority Data

Apr. 26, 1991 [JP] Japan .................................. 3-124917

[51] Int. Cl.$^5$ .............................................. C08J 9/00
[52] U.S. Cl. ......................................... 521/90; 521/73; 521/134; 521/145
[58] Field of Search ................... 521/90, 73, 145, 134

[56] References Cited

U.S. PATENT DOCUMENTS

| | | | |
|---|---|---|---|
| 3,802,949 | 4/1974 | Brown et al. | 521/73 |
| 4,031,045 | 6/1977 | Goswarni | 521/73 |
| 4,689,355 | 8/1987 | Treptow et al. | 521/145 |

FOREIGN PATENT DOCUMENTS

WO91/09076 6/1991 PCT Int'l Appl.

*Primary Examiner*—Morton Foelak
*Attorney, Agent, or Firm*—Millen, White, Zelano and Branigan

[57] ABSTRACT

Foamed articles of polyvinyl chloride resins are prepared by mixing an organic foaming agent having a temperature of foaming by decomposition of 100° C. or above and a plasticizer with a polyvinyl chloride resin containing epoxy group which is formed into particles having an average diameter in the range from 0.05 to 5 μm and has a concentration of the epoxy group at the surface of the particle of $1 \times 10^{-2}$ weight % or more and a concentration of the total epoxy group in the particles of the said resin of 10 weight % or less at a temperature where the organic foaming agent does not decompose and coating or molding the mixed compound with foaming by heating.

Foamed articles of polyvinyl chloride resins having excellent physical properties and high expansion ratios can be prepared without utilizing a crosslinking agent at the ambient pressure.

14 Claims, No Drawings

METHOD OF PREPARATION OF FOAMED ARTICLES OF POLYVINYL CHLORIDE RESINS

BACKGROUND OF THE INVENTION

1. Field of the Invention

The present invention relates to a novel method of preparation of foamed articles of polyvinyl chloride resins. More particularly, the present invention relates to a novel method of efficient preparation of foamed articles of polyvinyl chloride resins having high expansion ratios at the ambient pressure.

2. Description of the Prior Art

Various kinds of materials are utilized for plastic foamed articles. Polyvinyl chloride resins, among them, have excellent weatherability, can be colored readily, can be formed into various shapes and have other desirable properties. However, polyvinyl chloride resins are not utilized in large quantities like polyurethanes or polyolefins because articles of high expansion ratios are not easily prepared from polyvinyl chloride resins.

Foamed articles of high expansion ratios of polyvinyl chloride resins have generally been prepared under high pressure by introduction of an inert gas or by decomposition of foaming agents. In these conventional methods, an apparatus for the high pressure is necessary and productivity is kept low because of batch operations. Cost of the preparation in these methods is inevitably high.

When foaming at the ambient pressure is attempted, a problem arises that vinyl chloride resins have low melt viscosity above the temperatures of decomposition of conventional foaming agents to cause dissipation of the gas formed by the decomposition. When a foaming agent having a low decomposition temperature is utilized, another problem arises that melting of the polyvinyl chloride resin is insufficient, again causing dissipation of the gas formed by the decomposition. Thus, foamed articles of high expansion ratios can not be prepared by these conventional methods.

As another method of preparing foamed articles of polyvinyl chloride resins of high expansion ratios at the ambient pressure, a method of crosslinking a copolymer of vinyl chloride and ethylene by radio active irradiation, followed by decomposition of a foaming agent by heating was proposed (Japanese Patent Publication Showa 48-4863). In this method, cost of the foaming becomes high because expensive apparatus must be utilized for the irradiation. Furthermore, the polyvinyl resins tend to be aged and discolored by the irradiation.

A method of preparation of foamed articles of polyvinyl chloride resins of high expansion ratios having good cushoning property, weatherability and flame resistance by crosslinking and foaming of plastisol of polyvinyl chloride resins comprising a copolymer resin of vinyl chloride and a monomer having hydroxyl group, carboxyl group, epoxy group or alkoxy group, a plasticizer, a crosslinking agent and a foaming agent was disclosed (Japanese Patent Publication Showa 52-44588). This method has a problem that storage stability of the plastisol is inferior because crosslinking takes place gradually at the ambient temperature by the presence of the crosslinking agent and, thus, viscosity of the plastisol is increased with time. This method has also other problems that the expansion ratio can not be made to a high level as expected because the acid utilized as the crosslinking agent has tendency to suppress the foaming and that unreacted crosslinking agent remaining in the article is bleeded to the surface of the foamed article to cause various undesirable phenomena such as unsightly surface and removal of ink printed on the surface.

SUMMARY OF THE INVENTION

The present invention accordingly has an object to provide a method of preparation of crosslinked foamed article of polyvinyl chloride resins of high expansion ratios having excellent physical properties without utilizing crosslinking agents at the ambient pressure.

The present invention has been completed as a result of the extensive investigations undertaken with the object described above, leading to a discovery that the object can be attained by mixing an organic foaming agent having a specific decomposition temperature and a plasticizer with a polyvinyl chloride resin comprising a specific amount of epoxy group at a temperature where the organic foaming agent is not decomposed and by molding the mixed compound by foaming by heating. The present invention was completed on the basis of the discovery.

Thus, the method of preparation of foamed articles of polyvinyl chloride resins of the present invention comprises mixing of an organic foaming agent having a temperature of foaming by decomposition of 100° C. or above and a plasticizer with a polyvinyl chloride resin containing epoxy group which is formed into particles having an average diameter in the range from 0.05 to 5 $\mu$m and has a concentration of the epoxy group at the surface of the particle of $1 \times 10^{-2}$ weight % or more and a concentration of the total epoxy group in the particles of the said resin of 10 weight % or less at a temperature where the organic foaming agent is not decomposed and molding with foaming by heating.

Other and further objects, features and advantages of the invention will appear more fully from the following description.

DETAILED DESCRIPTION OF THE INVENTION

The polyvinyl chloride resin containing epoxy group utilized in the invention is (1) a copolymer comprising vinyl chloride units as the main component, monomer units having epoxy group and units of a monomer copolymerizable with vinyl chloride and the monomer having epoxy group introduced according to necessity or (2) a polymer which is prepared by adding epoxy group to a copolymer comprising vinyl chloride units as the main component and units of a monomer copolymerizable with vinyl chloride introduced according to necessity.

Examples of the the monomer copolymerizable with vinyl chloride and the monomer having epoxy group utilized according to necessity are vinyl esters of fatty acids such as vinyl acetate, vinyl propionate and the like; olefins such as ethylene, propylene and the like; vinylidene halides, such as vinylidene chloride, vinylidene fluoride and the like; vinyl ethers such as isobutyl vinyl ether, methyl vinyl ether, ethyl vinyl ether and the like; allyl compounds such as allyl chloride, methyl allyl ether and the like; and other like monomers. A single kind of the monomer units or a combination of two or more kinds of the monomer units may be introduced. The amount of the monomer units introduced in the polyvinyl chloride resin is preferably 10 weight % or less.

Examples of the monomer having epoxy group in the copolymer (1) are glycidyl ethers of unsaturated alcohols such as allyl glycidyl ether, metallyl glycidyl ether and the like; glycidyl esters of unsaturated acids such as glycidyl methacrylate, glycidyl acrylate, glycidyl p-vinylbenzoate, methyl glycidyl itaconate, glycidyl ethyl maleate, glycidyl vinylsulfonate, glycidyl (meth)allylsulfonate and the like; epoxides of olefins such as butadiene monooxide, vinylcyclohexene monooxide, 2-methyl-5,6-epoxyhexene and the like; and the like other monomers. A single kind of the monomer or a combination of two or more kinds of the monomer may be utilized.

As an example of the method of adding epoxy group to the copolymer comprising vinyl chloride units as the main component and units of a monomer copolymerizable with vinyl chloride introduced according to necessity for the preparation of the copolymer (2), a polyvinyl chloride resin is dehydrochlorinated by heat treatment or by contact with alkaline compounds and then epoxidized by peracids or the like.

It is necessary that the polyvinyl chloride resin containing epoxy group is formed into particles having a concentration of the epoxy group at the surface of the particle of $1 \times 10^{-2}$ weight % or more, preferably in the range from $5 \times 10^{-2}$ to $5 \times 10^{-1}$ weight %, and a concentration of the total epoxy group in the polymer particle of 10 weight % or less, preferably in the range from 0.5 to 5 weight %. When the concentration of epoxy group at the surface of the particle is less than $1 \times 10^{-2}$ weight %, the polyvinyl chloride resin shows inferior crosslinking property and when the concentration of the total epoxy group is more than 10 weight %, the plastisol has too high viscosity. The concentration of epoxy group at the surface of the particle and the concentration of the total epoxy group in the polymer particle can be measured according to the methods described later.

As the polyvinyl chloride resin containing epoxy group, the resin formed to particles having the structure that the concentration of epoxy group at the outershell of the particle is higher than the concentration of epoxy group of the inner part of the particle is particularly preferably.

When the polymerization is conducted to form a copolymer satisfying the condition that the concentration of epoxy group at the surface of the particle is within the range specified above and, simultaneously, that the concentration of epoxy group is homogeneously distributed throughout the whole part of the particle, the monomer unit having epoxy group is comprised in a rather large amount in the copolymer and swelling of the polymer particles by the plasticizer is remarkable. This situation tends to make the initial viscosity of plastisol higher and to enhance the increase of viscosity with time.

It is necessary that the polyvinyl chloride resin containing epoxy group is formed into particles having an average diameter in the range from 0.05 to 5 μm, preferably in the range from 0.5 to 5 μm. When the average diameter is within the range specified herein, the plastisol has good fluidity. However, when the average diameter is outside of the range, the plastisol has higher viscosity to cause inferior workability.

The polyvinyl chloride resin containing epoxy group can be prepared by emulsion polymerization or by microsuspension polymerization suitable for preparation of polyvinyl chloride resins utilized in the paste technique to the form of latex in which resin particles having average diameters of 0.05 to 5 μm are homogeneously dispersed.

The average degree of polymerization of the polyvinyl chloride resin utilized in the invention is preferably in the range from 600 to 3000. When the average degree of polymerization is less than 600, the resin does not have sufficient mechanical strength and, when the average degree of polymerization is more than 3000, a large amount of heat is required in the foaming process and the foaming tends to be inferior because of too high melt viscosity.

The polyvinyl chloride resin containing epoxy group formed to particles having the structure that the concentration of epoxy group at the outershell which contains the surface of the particle is higher than the concentration of epoxy group of the inner part of the particle can be prepared by methods in which the monomer containing epoxy group is charged to the reaction system in the later stage of the polymerization or an increasing amount of the monomer containing epoxy group with time is charged to the reaction system while the polymerization proceeds. Polymer of vinyl chloride is not dissolved in the monomeric vinyl chloride as well known and the polymer formed is precipitated in the droplets of the monomer. When the monomer containing epoxy group is added to the reaction system in the later stage of the polymerization, the polymer particles and aggregates of the particles having the outer shell composed of copolymers with larger amounts of epoxy group are formed by suspenstion polymerization or by bulk polymerization. This structure is particularly remarkably formed in the microsuspension polymerization with droplets of the monomer having the diameter of about 1 μm. In the cse of emulsion polymerization, the reaction of polymerization takes place always at the surface of the polymer particles where the particles are in contact with water. When an increasing amount of the monomer containing epoxy group with time is charged to the reaction system while the polymerization proceeds, the polyvinyl chloride resin containing epoxy group formed to particles having the structure that the concentration of epoxy group at the outershell of the particle is higher than the concentration of epoxy group of the inner part of the particle can be prepared.

Plasticizers utilized in the invention are not particularly limited but plasticizers generally utilized in polyvinyl chloride resins can be utilized. Examples of such generally utilized plasticizers are; derivatives of phthalic acid such as dimethyl phthalate, diethyl phthalate, dibutyl phthalate, di-(2-ethylhexyl) phthalate, di-n-octyl phthalate, diisobutyl phthalate, diheptyl phthalate, diphenyl phthalate, diisodecyl phthalate, ditridecyl phthalate, diundecyl phthalate, di(heptyl, nonyl, undecyl) phthalate, benzyl phthalate, butyl benzyl phthalate, dinonyl phthalate, dicyclohexyl phthalate and the like; derivatives of isophthalic acid such as dimethyl isophthalate, di-(2-ethylhexyl) isophthalate, diisooctyl isophthalate and the like; derivatives of tetrahydrophthalic acid such as di-(2-ethylhexyl) tetrahydrophthalate, di-n-octyl tetrahydrophthalate, diisodecyl tetrahydrophthalate and the like; derivatives of adipic acid such as di-n-butyl adipate, di-(2-ethylhexyl) adipate, diisodecyl adipate, diisononyl adipate and the like; derivatives of azelaic acid such as di-(2-ethylhexyl) azelate, diisooctyl azelate, di-n-hexyl azelate and the like; derivatives of sebacic acid such as di-n-butyl sebacate, di-(2-ethylhexyl) sebacate and the like; derivatives of maleic acid such as di-n-butyl maleate, dimethyl maleate, diethyl maleate, di-(2-ethylhexyl) maleate and the like; derivatives of fumaric acid such as di-n-butyl fumarate, di-(2-ethylhexyl) fumarate and the like; derivatives of trimellitic acid such as tri(2-ethylhexyl) trimellitate, tri-n-octyl trimellitate, triisodecyl trimellitate, triisooctyl trimellitate, tri-n-hexyl trimellitate, triisononyl trimellitate and the like; derivatives of pyromellitic acid such as tetra(2-ethylhexyl) pyromellitate, tetra-n-octyl pyromellitate and the like; derivatives of citric acid such as triethyl citrate, tri-n-butyl citrate, acetyl triethyl citrate, acetyl tri-(2-ethylhexyl) citrate and the like; derivatives of itaconic acid such as monomethyl itaconate, monobutyl itaconate, dimethyl itaconate, diethyl itaconate, dibutyl itaconate, di-(2-ethylhexyl) itaconate and the like; derivatives of oleic acid such as butyl oleate, glyceryl monooleate, diethyleneglycol monooleate and the like; derivatives of ricinolic acid such as methyl acetyl ricinolate butyl acetyl ricinolate, glyceryl monoricinolate, diethyleneglycol monoricinolate and the like; derivatives of stearic acid such as n-butyl stearate, glycerol monostearate, diethyleneglycol distearate and the like; other derivatives of fatty acids such as diethyleneglycol monolaurate, diethyleneglycol diperalgonate, fatty acid esters of pentaerythritol and the like; derivatives of phosphoric acid such as triethyl phosphate, tributyl phosphate, tri-(2-ethylhexyl) phosphate, tributoxyethyl phosphate, triphenyl phosphate, cresyl diphenyl phosphate, tricresyl phosphate, trixylenyl phosphate, tris(chloroethyl) phosphate and the like; derivatives of glycols such as diethyleneglycol dibenzoate, dipropyleneglycol dibenzoate, triethyleneglycol dibenzoate, triethyleneglycol di-(2-ethylbutyrate), triethyleneglycol di(2-ethylhexoate), dibutyl methylenebis-thioglycolate and the like; derivatives of glycerol such as glycerol monoacetate, glycerol triacetate, glycerol tributyrate and the like; epoxidized derivatives such as epoxidized soy bean oils, epoxybutyl stearate, di-(2-ethylhexyl) epoxyhexahydrophthalate, diisodecyl epoxyhexahydrophthalate, epoxytriglycerides, epoxidized octyl oleate, epoxidized decyl oleate and the like; polyester plasticizers, such as polyesters from adipic acid, polyesters from sebacic acid, polyesters from phthalic acid and the like; partially hydrogenated terphenyls, adhesive plasticizers and the like other plasticizers. A single kind of the plasticizer or a combination of two or more kinds of the plasticizers may be utilized.

The plasticizer is utilized in an amount in the range from 20 to 100 weight parts, preferably in the range from 40 to 80 weight parts, based on 100 weight parts of the polyvinyl chloride resin containing epoxy group. When the amount of the plasticizer is more than the amount specified herein, physical properties are deteriorated and, when the amount of the plasticizer is less than the amount specified herein, molded products becomes too hard.

As the foaming agent, an organic decomposition type foaming agent which forms foam by decomposition at the temperature of 100° C. or above, preferably in the range from 180° to 230° C., is indispensable. An inorganic decomposition type foaming agent having the decomposition temperature of 100° C. or above may be utilized together with the organic foaming agent. Gaseous agents, such as freons and carbon dioxide, microcapsules of high temperature expansion type, methods of mechanical foaming and other like agents and methods may be utilized together with the forming agent.

The reason that the organic decomposition type foaming agent is preferably among various decomposition type foaming agents is not entirely clear but is considered to be that products of the decomposition from the organic foaming agent accelerates crosslinking between the epoxy groups. Examples of the organic decomposition type foaming agents are azo foaming agents such as azodicarbonamide, azo-bis-formamide and the like, dinitrosopentamethylenetetramine, benzenesulfonylhydrazide, toluenesulfonylhydrazide, p,p'-hydroxybenzenesulfonylhydrazide and the like other compounds. The organic decomposition type foaming agents can be utilized together with foaming accelerators. Examples of the preferably foaming accelerators are lead oxides, lead stearate, cadmium stearate, zinc stearate, barium stearate, sodium compounds, potassium compounds, urea and the like other compounds.

It is more preferably to utilize the organic foaming agent of smaller diameterfor for preparing foamed articles having homogeneous cell diameter and rigid cell walls. The organic foaming agents of particles having the diameter of 30 $\mu$m or less, preferably 20 $\mu$m or less, is advantageously utilized for efficiently preparing the foamed articles having the optimum foam diameter in the range from 0.1 to 0.6 $\mu$m, preferably of about 0.3 $\mu$m, against the back pressure by the matrix polymer.

When a foaming agent other than the organic or inorganic decomposition type foaming agents or a foaming agent having the decomposition temperature below 100° C. is utilized, such problems as that sufficient expansion ratio can not be attained and that the homogeneously foamed structure can not be prepared arise.

The foaming agent of the invention is compounded in an amount in the range from 0.5 to 30 weight parts, preferably in the range from 1 to 25 weight parts, based on 100 weight parts of the polyvinyl chloride resin containing epoxy group. When the amount compounded is less than 0.5 weight parts, the foaming is insufficient and, when the amount compounded is more than 30 weight parts, degree of the foaming is not so improved as expected and the condition is rather economically unfavorable.

When the inorganic decomposition type foaming agent having the decomposition temperature of 100° C. or above is utilized together with the organic foaming agent, the inorganic foaming agent is generally compounded in the amount less than that of organic foaming agent.

A surface active agent may be utilized together with the above components to form better sell structures according to necessity. As the surface active agent, an ionic surface active agent, particularly an anionic surface active agent, is preferable. Examples of the surface active agents are ester salts of alkylsulfuric acid, such as sodium lauryl sulfate, sodium myristyl sulfate and the like; salts of alkylarylsulfonates, such as sodium dodecylbenzenesulfonate, potassium dodecylbenzenesulfonate and the like; ester salts of sulfosuccinic acid, such as sodium dioctyl sulfosucciate, sodium dihexyl sulfosuccinate and the like; salts of fatty acids, such as ammonium laurate, potassium stearate and the like; ester salts of polyoxyethylenealkylsulfuric acids; ester salts of polyoxyethylenealkylarylsulfuric acid; salts of rosin acid; and the like other compounds. The surface active agent is compounded in the amount generally in the range from 0.05 to 5.0 weight parts, preferably in the range from 0.2 to 3.0 weight parts based on 100 weight parts of the polyvinyl chloride resin containing epoxy group.

In the polyvinyl chloride resin containing epoxy group of the invention, a heat stabilizer, a ultraviolet absorbent, an antioxidant and the like other agents may be added according to necessity in addition to the plasticizer and the foaming agent. The kind of the heat stabilizer is not particularly limited but a suitable heat stabilizer is selected from heat stabilizers generally utilized for polyvinyl chloride resins and utilized. Resins having functional groups which can be combined to epoxy resins, (meth)acrylic resins or epoxy group, such as carboxyl group and amino group, may be added. Examples of such resins having functional groups are metallic soaps, such as Ba-Zn metallic soaps, Ca-Zn metallic soaps, Ca-Ba-Zn metallic soaps, Cd-Ba-Zn soaps, Pb metallic soaps and the like; alkylated tin compounds of fatty acids such as dibutyltin dilaurate, dibutyltin dimaleate, octyltin maleate and the like; and the like other compounds. Costabilizers, such as chelaters, epoxidized soy bean oils and the like, may be utilized together.

Non-metallic stabilizers, such as tributylamide of nitrilotripropionic acid, 2,3-dichloroaniline, epoxy stabilizers and the like, may be utilized together.

As the ultraviolet absorbents, benzotriazole ultraviolet absorbents are favorably utilized. Examples of such benzotriazole ultraviolet absorbents are 2-(2'-hydroxy-5'-methylphenyl)benzotriazole, 2-(2'-hydroxy-3'-tertiary-butyl-5'-methylphenyl)-5-chlorobenzotriazole, 2-(2'-hydroxy-3',5'-di-tertiary-butylphenyl)-5-chlorobenzotriazole, 2-(2'-hydroxy-4'-octoxyphenyl)benzotriazole and the like. Hindered amine light stabilizers may be utilized favorably.

As the antioxidants, phenolic antioxidants are favorably utilized. Examples of such phenolic antioxidants are 2,6-di-tertiary-butyl-p-cresol, 2,2'-methylene-bis-(4-methyl-6-tertiary-butylphenol), 4,4'-butylidene-bis-(3-methyl-6-tertiary-butylphenol), 4.4'-thio-bis-(3-methyl-6-tertiary-butyl-phenol) and the like.

Thickening agents, diluents, pigments, fillers such as calcium carbonate, clay, tarc and the like, coupling agents such as silane coupling agents and titanate coupling agents and the other like ingredients may be compounded according to necessity.

The plasticizer, the foaming agent and the other components added according to necessity are mixed with the polyvinyl chloride resin containing epoxy group at a temperature that the decomposition of the foaming agent does not take place and the plastisol is prepared. As the apparatus of mixing, a Hobart mixer, a kneader, a Henschel mixer and the like are generally utilized. The plastisol is coated on the surface of a substrate or poured into a mold after defoaming of the plastisol, when necessary, and foamed by heating preferably to a temperature in the range from 130° to 220° C. for a period of time in the range from 30 seconds to 10 minutes to prepare the foamed article of the polyvinyl chloride resin having high expansion ratio as desired. As the apparatus for the heating, the apparatus generally utilized for the paste technique, such as a heating oven of hot air circulation, a (far)infrared heating oven, an induction heating oven and the like may be utilized.

DESCRIPTION OF THE PREFERRED EMBODIMENTS

The invention will be understood more readily with reference to the following examples; however, these examples are intended to illustrate the invention and are not to be construed to limit the scope of the invention.

Measurements of properties were conducted according to the following methods.

(1) Concentration of epoxy group at the surface of particles of the polyvinyl chloride resin containing epoxy group Into a 300 ml wide neck glass vessel having a glass stopper, 5 g of the resin, 1 ml of a 1N aqueous solution of hydrochloric acid and 100 ml of methanol were charged. The mixture was mixed for 1 hour by using a magnetic stirrer and, after ultrasonic treatment at 40° C., titrated with a 1/10N alcohol solution of KOH (the quantity of titration: a ml). The same solution except that the resin was not contained was prepared and titrated by the same method as the above solution (blank; the quantity of titration: b ml). The concentration of epoxy group at the surface of particles of the resin was calculated by the following formula:

Concentration of epoxy group at the surface of the resin (weight %) = $43 \times (b-a)f_2 \times 0.1/w \times 10^{-1}$ where
$f_2$: factor of the 1/10N KOH solution
$w$: weight of the sample (g)

(2) Concentration of the total epoxy group in the particls of the polyvinyl chloride resin containing epoxy group Into a 300 ml wide necked glass vessel having a glass stopper, 1 g of the resin containing epoxy group dissolved in 100 ml of methyl ethyl ketone and 2 ml of a 1N aqueous solution of hydrochloric acid were charged. The solution was mixed for 1 hour by using a magnetic stirrer and titrated with a 1/10N alcohol solution of KOH (the quantity of titration: a ml). The same solution except that the resin was not contained was prepared and titrated by the same method as the above solution (blank; the quantity of titration: b ml). The total concentration of epoxy group (weight %) was calculated by the following formula:

Concentration of the total epoxy group (weight %) = $43 \times (b-a)f_2 \times 0.1/w \times 10^{-1}$ where
$f_2$: factor of the 1/10N KOH solution
$w$: weight of the sample (g)

(3) Change with time of viscosity of the plastisol

A sample of the plastisol was stored for 7 days at 23° C. Viscosity was measured at the beginning and at the end of the storage and the ratio of the viscosity after 7 days to the initial viscosity was calculated.

(4) Expansion ratio of the foamed material

The expansion ratio was calculated by using the following formula:

expansion ratio = thickness of the foamed layer/thickness of the initially applied layer (thickness of the semicured layer)

(5) Heat shrinkage of the foamed material

A sample was heated at 230° C. for 60 seconds and the heat shrinkage was calculated by using the following formula:

heat shrinkage = thickness after heating/thickness before heating (6) Solubility of the foamed material in THF A sample sheet of the foamed material of 1 cm square was dipped into tetrahydrofuran (THF) and the condi-

EXAMPLE OF PREPARATION OF MATERIAL 1

Preparation of PVC-1.

Into a 1000 l stainless steel autoclave, 160 weight parts of deionized water, 0.4 weight parts of sodium dioctylsulfosuccinate, 1 weight part of lauryl alcohol and 0.4 weight parts of lauroyl peroxide were charged and degased. To the mixture, 97 weight parts of vinyl chloride were added and an emulsion was prepared under stirring. The emulsified mixture was homogenized by a homogenizer and then transferred to another degased 1000 l autoclave. Polymerization was started by raising the temperature to 45° C. After 5 hours of raising the temperature when the conversion of the polymerization reached to 40%, 3 weight parts of glycidyl methacrylate were continuously added to the autoclave during 3 hours while the polymerization reaction was still continued and the polymerization was finished after 12 hours. Unreacted monomer was recovered under the reduced pressure. The reaction product was dried with a spray drier and pulverized to obtain the product PVC-1.

EXAMPLE OF PREPARATION OF MATERIAL 2

Preparation of PVC-2

Into a 1000 l stainless steel autoclave, 160 weight parts of deionized water, 0.4 weight parts of sodium dioctylsulfosuccinate, 1 weight part of lauryl alcohol and 0.4 weight parts of lauroyl peroxide were charged and degased. To the mixture, 97 weight parts of vinyl chloride were added and an emulsion was prepared under stirring. The emulsified mixture was homogenized by a homogenizer and then transferred to another degased 1000 l autoclave. Polymerization was started by raising the temperature to 60° C. After 6 hours of raising the temperature when the conversion of the polymerization reached to 40%, 3 weight parts of glycidyl methacrylate were continuously added to the autoclave during 3 hours while the polymerization reaction was still continued and the polymerization was finished after 10 hours. Unreacted monomer was recovered under the reduced pressure. The reaction product was dried with a spray drier and pulverized to obtain the product PVC-2.

EXAMPLE OF PREPARATION OF MATERIAL 3

Preparation of PVC-4.

Into a 1000 l stainless steel autoclave, 160 weight parts of deionized water, 0.4 weight parts of sodium dioctylsulfosuccinate, 1 weight part of lauryl alcohol and 0.4 weight parts of lauroyl peroxide were charged and degased. To the mixture, 90 weight parts of vinyl chloride were added and an emulsion was prepared under stirring. The emulsified mixture was homogenized by a homogenizer and then transferred to another degased 1000 l autoclave. Polymerization was started by raising the temperature to 45° C. Immediately after raising the temperature, 10 weight parts of glycidyl methacrylate were continuously added to the autoclave during 10 hours while the polymerization reaction was continued and the polymerization was finished after 12 hours. Unreacted monomer was recovered under the reduced pressure. The reaction product was dried with a spray drier and pulverized to obtain the product PVC-4.

EXAMPLE OF PREPARATION OF MATERIAL 4

Preparation of PVC-5.

The material PVC-5 was prepared by the same method as in Example of preparation of material 1 except that 98 weight parts of vinyl chloride were added and that, immediately after raising the temperature, 2 weight parts of glycidyl methacrylate were continuously added to the autoclave during 8 hours while the polymerization reaction was continued. Thus, the product PVC-5 was obtained.

EXAMPLES 1 THROUGH 4 AND COMPARATIVE EXAMPLES 1 THROUGH 5

Components shown in Table 1 were charged into a vacuum high speed defoamer in amounts shown in the table, mixed and defoamed to prepare plastisols. Each of the plastisols was coated on two sheets of flame retarded paper to form a coating layer of 50 μm and a coating layer of 500 μm on the respective two sheets. Semicured sheets were prepared by heating the coated sheets at 150° C. for 45 seconds.

Foamed materials were prepared by heating the semicured sheets at 210° C. for 60 seconds. Results of the evaluation of the properties are shown in Table 1.

Azodicarbonamide utilized in the examples was formed with homogeneous particles having the average diameter of the particles in the range from 1 to 10 μm.

While the invention has been particularly shown and described with reference to preferred embodiments thereof, it will be understood by those skilled in the art that the foregoing and other changes in form and details can be made therein without departing from the spirit and scope of the invention.

To summarize the advantages obtained by the invention, a foamed article of polyvinyl chloride resin having excellent physical properties and a high expansion ratio can be prepared easily without utilizing a crosslinking agent at the ambient pressure.

TABLE 1

| Example | 1 | 2 | 3 | 4 |
|---|---|---|---|---|
| Composition of plastisol (weight parts) | | | | |
| PVC-1[1)] | 100 | — | 80 | 100 |
| PVC-2[2)] | — | 100 | — | — |
| PVC-3[3)] | — | — | 20 | — |
| PVC-4[4)] | — | — | — | — |
| PVC-5[5)] | — | — | — | — |
| DOP[6)] | 60 | 70 | 60 | 60 |
| azodicarbonamide | 25 | 25 | 25 | 25 |
| calcium carbonate | 80 | 80 | 80 | — |
| titanium oxide | 15 | 15 | 15 | — |
| Ba—Zn heat stabilizer | 3 | 3 | 3 | 3 |
| DBSNa[7)] | — | 1 | 1 | 1 |
| diluent | 8 | 8 | 8 | 5 |

TABLE 1-continued

| | | | | |
|---|---|---|---|---|
| crosslinking agent (adipic acid) | — | — | — | — |
| Properties of plastisol | | | | |
| initial viscosity[8] | 2000 | 18800 | 19300 | 6000 |
| viscosity change with time | 1.6 | 1.7 | 1.7 | 1.6 |
| Properties of foamed material | | | | |
| expansion ratio | | | | |
| 50 μm | 22.0 | 28.6 | 21.8 | 20.9 |
| 500 μm | 24.3 | 30.3 | 24.0 | 23.2 |
| heat shrinkage | | | | |
| 50 μm | 0.91 | 0.92 | 0.89 | 0.90 |
| 500 μm | 0.93 | 0.89 | 0.90 | 0.85 |
| solubility in THF | | | | |
| 50 μm | insoluble | insoluble | insoluble | insoluble |
| 500 μm | insoluble | insoluble | insoluble | insoluble |

| Comparative example | 1 | 2 | 3 | 4 | 5 |
|---|---|---|---|---|---|
| Composition of plastisol (weight parts) | | | | | |
| PVC-1[1] | 100 | 100 | — | — | — |
| PVC-2[2] | — | — | — | — | — |
| PVC-3[3] | — | — | 100 | — | — |
| PVC-4[4] | — | — | — | 100 | — |
| PVC-5[5] | — | — | — | — | 100 |
| DOP[6] | 60 | 60 | 60 | 60 | 60 |
| azodicarbonamide | — | 25 | 25 | 25 | 25 |
| calcium carbonate | 80 | 80 | 80 | 80 | 80 |
| titanium oxide | 15 | 15 | 15 | 15 | 15 |
| Ba—Zn heat stabilizer | 3 | 3 | 3 | 3 | 3 |
| DBSNa[7] | — | — | — | — | 1 |
| diluent | 8 | 8 | 8 | 8 | 8 |
| crosslinking agent (adipic acid) | — | 5 | — | — | — |
| Properties of plastisol | | | | | |
| initial viscosity (cps)[8] | 4600 | 21000 | 19900 | 45000 | 17500 |
| viscosity change with time | 1.3 | 3.2 | 1.5 | 6.0 | 1.8 |
| Properties of foamed material | | | | | |
| expansion ratio | | | | | |
| 50 μm | not foamed | 17.3 | 12.8 | 20.8 | 21.5 |
| 500 μm | not foamed | 18.4 | 15.3 | 22.4 | 23.7 |
| heat shrinkage | | | | | |
| 50 μm | not foamed | 0.93 | 0.58 | 0.90 | 0.52 |
| 500 μm | not foamed | 0.90 | 0.43 | 0.89 | 0.39 |
| solubility in THF | | | | | |
| 50 μm | soluble | insoluble | soluble | insoluble | soluble |
| 500 μm | soluble | insoluble | soluble | insoluble | soluble |

[1]PVC-1: a polyvinyl chloride resin containing epoxy group; average diameter of particles 0.9 μm, average degree of polymerization 820, concentration of epoxy group at the surface of the particles 0.09 weight % and concentration of the total epoxy group 0.92 weight %.
[2]PVC-2: a polyvinyl chloride resin containing epoxy group; average diameter of particles 1.0 μm, average degree of polymerization 1250, concentration of epoxy group at the surface of the particles 0.10 weight % and concentration of the total epoxy group 1.03 weight %.
[3]PVC-3: polyvinyl chloride, Zeon Resin 65 ® (a product of Japan Zeon Co., Ltd.)
[4]PVC-4: a polyvinyl chloride resin containing epoxy group; average diameter of particles 1.0 μm, average degree of polymerization 1200, concentration of epoxy group at the surface of the particles 0.1 weight % and concentration of the total epoxy group 2.7 weight %.
[5]PVC-5: a polyvinyl chloride resin containing epoxy group; average diameter of particles 0.8 μm, average degree of polymerization 1600, concentration of epoxy group at the surface of the particles 0.006 weight % and concentration of the total epoxy group 0.7 weight %.
[6]DOP: dioctyl phthalate
[7]DBSNa: sodium dodecylbenzenesulfonate
[8]measured by using a rotatory viscometer at the shear rate of $1\ \text{sec}^{-1}$.

What is claimed is:

1. A method of preparation of foamed articles of polyvinyl chloride resins which comprises mixing of an organic foaming agent having a temperature of foaming by decomposition of 100° C. or above and a plasticizer with a polyvinyl chloride resin containing epoxy group which is formed into particles having an average diameter in the range from 0.05 to 5 μm and has a concentration of the epoxy group at the surface of the particle of $1 \times 10^{-2}$ weight % or more and a concentration of the total epoxy group in the particles of the said resin of 10 weight % or less at a temperature where the organic foaming agent does not decompose and coating or molding with foaming by heating.

2. A method of preparation of foamed articles of polyvinyl chloride resins as claimed in claim 1 wherein the polyvinyl chloride resin containing epoxy group is formed to particles having the structure that the concentration of epoxy group at the outershell of the particle is higher than the concentration of epoxy group of the inner part of the particle.

3. A method of preparation of foamed articles of polyvinyl chloride resins as claimed in claim 1 wherein the concentration of the epoxy group at the surface of the particle is in the range from $5 \times 10^{-2}$ to $5 \times 10^{-1}$ weight %.

4. A method of preparation of foamed articles of polyvinyl chloride resins as claimed in claim 1 wherein the concentration of the total epoxy group in the particles of the said resin is in the range from 0.5 to 5 weight %.

5. A method of preparation of foamed articles of polyvinyl chloride resins as claimed in claim 1 wherein the concentration of the epoxy group at the surface of the particle is in the range from $5\times10^{-2}$ to $5\times10^{-1}$ weight % and the concentration of the total epoxy group in the particles of the said resin is in the range from 0.5 to 5 weight %.

6. A method of preparation of foamed articles of polyvinyl chloride resins as claimed in claim 1 wherein from 0.5 to 30 weight parts of the organic foaming agent and from 20 to 80 weight parts of the plasticizer based on 100 weight parts of the vinyl chloride resin containing epoxy group are utilized.

7. A method of preparation of foamed articles of polyvinyl chloride resins as claimed in claim 1 wherein from 1 to 25 weight parts of the organic foaming agent and from 40 to 80 weight parts of the plasticizer based on 100 weight parts of the vinyl chloride resin containing epoxy group are utilized.

8. A method of preparation of foamed articles of polyvinyl chloride resins as claimed in claim 1 wherein the degree of polymerization of the polyvinyl chloride resin containing epoxy group is in the range from 600 to 3000.

9. A method of preparation of foamed articles of polyvinyl chloride resins as claimed in claim 1 wherein the organic foaming agent is in a form of particles having a diameter of 30 μm or less.

10. A method of preparation of foamed articles of polyvinyl chloride resins as claimed in claim 1 wherein the organic foaming agent is in a form of particles having a diameter of 20 μm or less.

11. A method of preparation of foamed articles of polyvinyl chloride resins as claimed in claim 1 wherein the organic foaming agent is at least one kind of compound selected from the group consisting of azodicarbonamide, azo-bis-formamide, dinitrosopentamethylenetetramine, benzenesulfonylhydrazide, toluenesulfonylhydrazide and p,p'-hydroxybenzenesulfonylhydrazide.

12. A method of preparation of foamed articles of polyvinyl chloride resins as claimed in claim 1 wherein from 0.05 to 5 weight parts of a surface active agent based on 100 weight parts of the polyvinyl chloride resin containing epoxy group are compounded.

13. A method of preparation of foamed articles of polyvinyl chloride resins as claimed in claim 1 wherein the polyvinyl chloride resin containing epoxy group is a copolymer comprising vinyl chloride units as the main component, monomer units having epoxy group and units of a monomer copolymerizable with vinyl chloride and the monomer having epoxy group and introduced according to necessity or a polymer which is prepared by adding epoxy group to a copolymer comprising vinyl chloride units as the main component and units of a monomer copolymerizable with vinyl chloride and introduced according to necessity.

14. A method of preparation of foamed articles of polyvinyl chloride resins as claimed in claim 8 wherein the monomer copolymerizable with vinyl chloride and the monomer having epoxy group and introduced according to necessity or the monomer copolymerizable with vinyl chloride and introduced according to necessity is comprised in an amount of 10 weight % or less.

* * * * *